(12) United States Patent
Vanelli et al.

(10) Patent No.: US 12,485,612 B2
(45) Date of Patent: Dec. 2, 2025

(54) ADDITIVE MANUFACTURE SYSTEM USING LIGHT VALVE DEVICE

(71) Applicant: EOS of North America, Inc., Novi, MI (US)

(72) Inventors: Donald Lewis Vanelli, Novi, MI (US); Lance Bruce Shanklin, Novi, MI (US); Gregory Richard Hayes, Novi, MI (US); Hakan Pfeiffer, Novi, MI (US)

(73) Assignees: EOS of North America, Inc.; AM Ventures Holding GmbH, Starnberg (DE)

( * ) Notice: Subject to any disclaimer, the term of this patent is extended or adjusted under 35 U.S.C. 154(b) by 0 days.

(21) Appl. No.: 18/217,814

(22) Filed: Jul. 3, 2023

(65) Prior Publication Data

US 2023/0347591 A1    Nov. 2, 2023

Related U.S. Application Data

(62) Division of application No. 16/226,980, filed on Dec. 20, 2018, now abandoned.
(Continued)

(51) Int. Cl.
*B29C 64/268* (2017.01)
*B23K 26/062* (2014.01)
(Continued)

(52) U.S. Cl.
CPC .......... *B29C 64/268* (2017.08); *B23K 26/062* (2015.10); *B23K 26/064* (2015.10);
(Continued)

(58) Field of Classification Search
CPC ... B29C 64/129; B29C 64/135; B29C 64/264; B29C 64/268; B29C 64/273;
(Continued)

(56) References Cited

U.S. PATENT DOCUMENTS 6,717,106 B2    4/2004    Nagano et al.
7,894,921 B2    2/2011    John
(Continued)

FOREIGN PATENT DOCUMENTS

EP        3363579        8/2018
JP        2003080604     3/2003
(Continued)

OTHER PUBLICATIONS

Japanese Office Action for Application No. 2020-555724, dated Jul. 13, 2022, 2 pages.
(Continued)

*Primary Examiner* — Philip C Tucker
*Assistant Examiner* — Jimmy R Smith, Jr.
(74) *Attorney, Agent, or Firm* — Polsinelli PC (57) ABSTRACT

An object build area is exposed to a radiation beam, such as a laser light source, which has been processed and controlled through a grating light valve or valves, or planar light valve, to thereby melt, sinter, fuse or cure predetermined portions of the build area corresponding to the equivalent of individually controlled pixels, with rapid movement and positioning of the resulting LV application output array on the build area. The LV arrangement is adapted to also generally heat an entire powder bed, or targeted areas of the bed, to just below melting temperature.

5 Claims, 6 Drawing Sheets

Related U.S. Application Data (60) Provisional application No. 62/611,877, filed on Dec. 29, 2017.

(51) Int. Cl.
| | |
|---|---|
| *B23K 26/064* | (2014.01) |
| *B23K 26/073* | (2006.01) |
| *B23K 26/082* | (2014.01) |
| *B23K 26/342* | (2014.01) |
| *B23K 26/70* | (2014.01) |
| *B29C 64/153* | (2017.01) |
| *B33Y 10/00* | (2015.01) |
| *B33Y 30/00* | (2015.01) |

(52) U.S. Cl.
CPC .......... *B23K 26/073* (2013.01); *B23K 26/082* (2015.10); *B23K 26/342* (2015.10); *B23K 26/704* (2015.10); *B29C 64/153* (2017.08); *B33Y 10/00* (2014.12); *B33Y 30/00* (2014.12)

(58) Field of Classification Search
CPC ... B29C 64/277; B29C 64/282; B29C 64/286; B29C 64/291; B29C 71/04; B29C 64/295
See application file for complete search history.

(56) References Cited

U.S. PATENT DOCUMENTS

| | | | |
|---|---|---|---|
| 9,561,622 B2 | 2/2017 | Das | |
| 2003/0052105 A1* | 3/2003 | Nagano | B29C 64/153 219/121.83 |
| 2003/0152756 A1 | 8/2003 | Yamada et al. | |
| 2003/0214571 A1 | 11/2003 | Hiromi et al. | |
| 2011/0259862 A1* | 10/2011 | Scott | B23K 26/34 219/121.73 |
| 2013/0136868 A1* | 5/2013 | Bruck | B23K 26/342 427/532 |
| 2013/0206967 A1* | 8/2013 | Shpunt | G06F 3/011 359/619 |
| 2014/0263209 A1 | 9/2014 | Burris et al. | |
| 2015/0077732 A1 | 3/2015 | Owa | |
| 2017/0120518 A1 | 5/2017 | DeMuth | |
| 2017/0144224 A1 | 5/2017 | DeMuth et al. | |
| 2017/0217091 A1 | 8/2017 | Hull | |
| 2017/0232557 A1 | 8/2017 | DeMuth | |
| 2017/0274601 A1 | 9/2017 | Dunne | |
| 2017/0341180 A1* | 11/2017 | Zediker | B23K 26/21 |
| 2018/0186074 A1 | 7/2018 | Hull | |
| 2018/0207722 A1 | 7/2018 | Feldmann | |
| 2018/0207725 A1 | 7/2018 | Chen | |
| 2018/0326666 A1 | 11/2018 | Kelly | |

FOREIGN PATENT DOCUMENTS

| | | | |
|---|---|---|---|
| JP | 2008185607 | 8/2008 | |
| WO | 2017015241 | 1/2017 | |
| WO | WO-2018109734 A2 * | 6/2018 | ............. B22F 12/00 |
| WO | 2019058883 | 3/2019 | |
| WO | 2019133422 | 7/2019 | |

OTHER PUBLICATIONS

European Search Report for Application No. 18896072.8, dated May 25, 2021, 9 pages.
PCT Search Report and Written Opinion for Application No. PCT/US18/66709, dated Apr. 2, 2019, 10 pages.

* cited by examiner

ADDITIVE MANUFACTURE SYSTEM USING LIGHT VALVE DEVICE

FIELD OF THE DISCLOSURE

The present invention relates to additive manufacture wherein successive layers of an object or workpiece are built up from a powder, fluid or other fluent medium according to previously determined successive so-called 2 dimensional "slices" of the object or workpiece, and more particularly to a system and method using an improved grating light valve and an energy beam (e.g., laser) which can be rapidly scanned across the build area for significantly increased build speed.

BACKGROUND OF THE INVENTION

Additive prototyping or manufacture techniques using a laser or other energy beam to melt, fuse, cure, sinter or otherwise solidify material to build an object or workpiece (hereafter simply referred to as an object) in a layerwise manner are well known. It is a continuing effort in the field to speed up the build process, to thereby shorten the time required to build an object. In one standard approach, an energy beam, such as a laser beam, is focused to a spot size and caused to scan over a build area in accordance with controlling apparatus that is driven by software which recreates a layer or "two-dimensional" slice of an object being built up. Layers are consecutively solidified and joined, as by hardening (e.g., a liquid polymer), fusing, melting, sintering or the like. The speed of scanning of a laser beam is of course limited by a single focus point (when one laser is used), and the inertial forces affecting movement of the scanner. It can therefore take many hours to make an object.

SUMMARY

In accordance with one aspect of the invention, an object build area is exposed to a radiation beam, such as a laser light source, which has been processed and controlled through a grating light valve or valves (GLV). It is therefore possible to melt, sinter, fuse or cure predetermined portions of the build area corresponding to the equivalent of individually controlled pixels, with rapid movement and positioning of the resulting GLV application output array on the build area. Conceptually, the GLV takes the laser light source and transforms it into an array of individually controllable spots or pixels. That array can then be moved as a line across the build area surface. Build speed is considerably increased, and fine detail improved, among other advantages.

A very significant use of a GLV arrangement according to the present invention is to generally heat an entire powder bed, or targeted areas of the bed, to just below melting temperature. This general heating is desirable for a number of reasons well known in the art. But instead of the use of dedicated bed heating elements, such as separate radiant heaters, the present invention can be employed to heat the bed using the same components used for solidification. This can be done through defocusing the linear beam array when not building or by rapid scanning with a tighter beam. Control of general heating through use of the GLV also allows differentially heating just in the vicinity of the part build.

The inventive GLV-based system is scalable by using multiple existing GLV devices, or through adaptation of a large array GLV. Use of a PLV (planar light valve) is also contemplated, being adapted in a similar manner as the GLV disclosed herein. The PLV is a two-dimensional equivalent of the "one-dimensional" GLV, capable of transmitting higher power due to increased active chip area and may also function as a phase modulator.

In accordance with an aspect of the invention, an apparatus for making an object in additive manufacture using an energetic source of solidifying radiation working upon a material in a build area has an optical element expanding a beam source into a planar beam. At least one light valve, as of a grating light valve (GLV) or planar light valve (PLV), receiving the planar beam. A beam expander for expanding a beam generated by the LV may be provided, along with a scanning device receiving the expanded beam from the beam expander and conveying the expanded beam toward a build area surface.

A lens or lens array may be used to correct the beam from the scanning device for distortion correction prior to exposing the build area as an expanded work beam (work beam being used to refer to the beam at the build area surface which is applying the energy for building a layer of the object).

A controller operates the light valve and scanning device according to predetermined exposure detail constituting individual layers or slices in the build up of an object through additive manufacture. The controller may be operated in a mode whereby the expanded work beam is extended across substantially the entire build area surface in a single sweep by the scanning device.

In an aspect of the invention, the controller operates the system to use the expanded work beam for heating of the build area surface to a temperature below that of solidification of the material.

Considering the build area having a length and a width, and the work beam as an elongated expanded work beam having an end to end length, another aspect of the invention is operated in a mode whereby the expanded work beam is scanned along the length of the build area but its length is less than the width of the build area, the expanded work beam thereby being applied to the build area surface in passes along the length of the build area. The passes may be adjacent one to the next and together cover the extent of the build area surface in the build up of a layer. Or the passes can be controlled to move the expanded work beam along only desired lengthwise passes and thereby covering less than the entire extent of the build area surface in the build up of a layer. The foregoing system may be operated in a raster scan mode. The controller may operate the expanded work beam in a TV mode.

DESCRIPTION OF EXEMPLARY EMBODIMENTS

Figure 1:
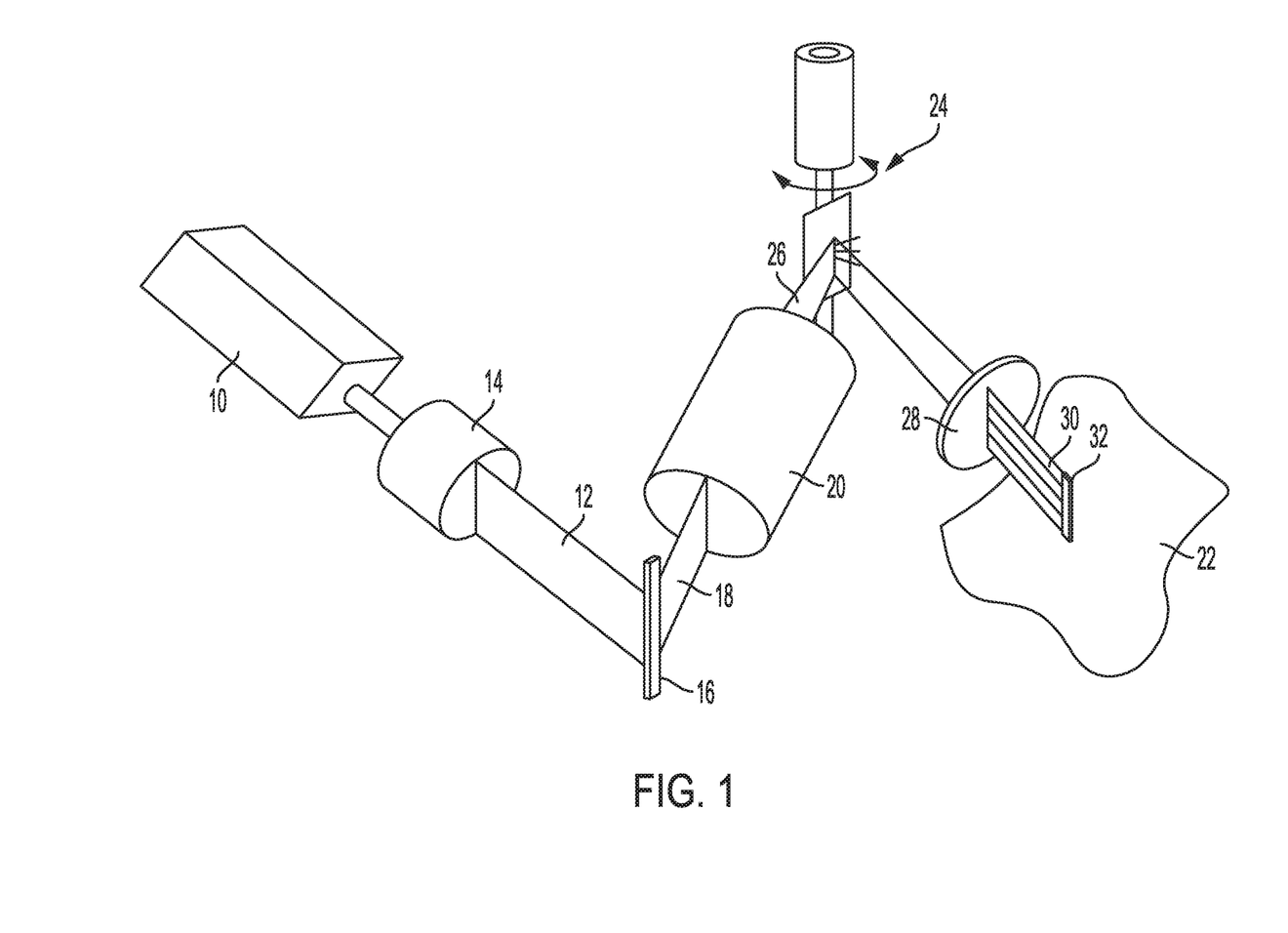
FIG. 1 is a schematic view of the major components of a first embodiment assembly using a GLV for additive manufacture made in accordance with an aspect of the invention.

Referring now to FIG. 1, an embodiment is shown in schematic presentation using an exemplary arrangement of major components. A radiation source, such as light source 10 in the form of a standard 808 nanometer laser at 120 W, is focused to a planar beam 12 using appropriate optics, such as a slit aperture or lens. The planar beam 12 is then focused upon a grating light valve 16 (GLV), which is a form of spatial light modulator of the MEMS (micro electro mechanical systems) type. The output 18 from the GLV is then processed through a beam expander lens 20 to an operational width for application to the object build area 22. More will be described about the GLV and its operation momentarily. Completing the major components of this particular embodiment is a scanner 24 (single galvo) which moves the expanded beam 26 through an F-theta lens 28, which is used for distortion correction. The ultimate beam 30 from the lens 28 is then a fairly elongated linear array 32 or line segment, which is focused upon the object build area surface.

Figure 2:
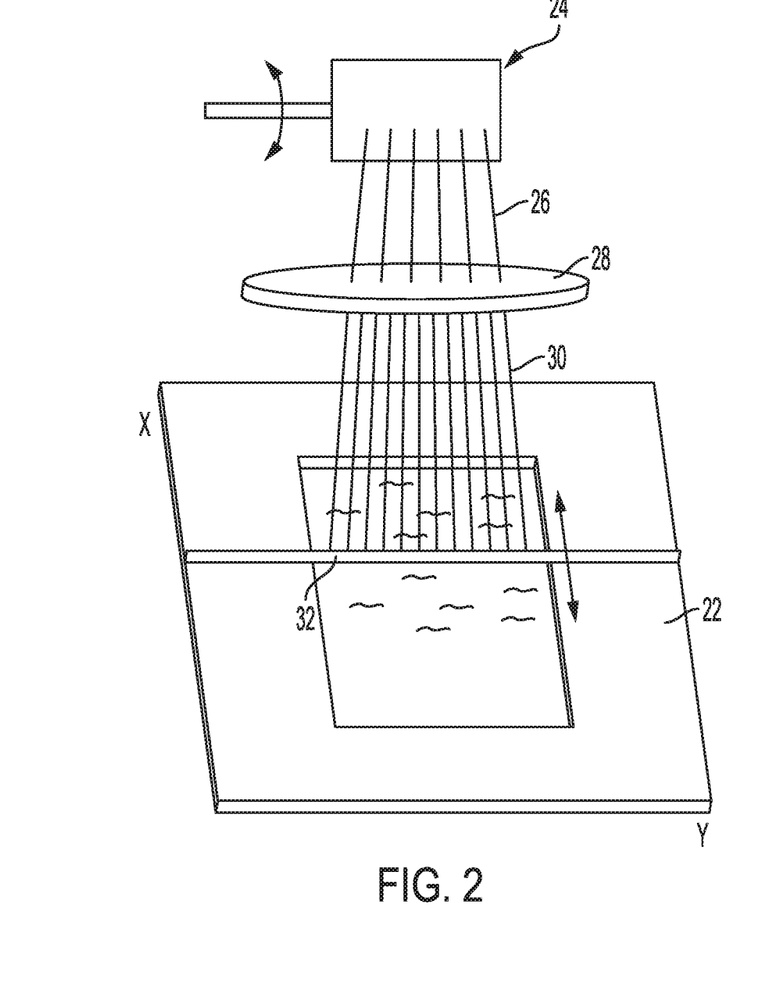
FIG. 2 is an illustration of how the beam from the assembly of FIG. 1 could be scanned across a build area.

As seen in FIG. 2, the linear array 32 extends across a segment of the build area 22, such as a width, all of which can be simultaneously exposed, or just portions thereof. The scanner 24 moves the linear array 32 perpendicular to the width, to thereby expose desired portions of the build area to the beam of the radiation source 10. The operation and other principal components of the additive manufacture system being employed, such as a laser melting system (e.g., powder bed selective laser melting, fusing or sintering) are standard and readily adaptable for the invention. Such can be found and reference can be made to an EOS P396 system sold by EOS GmbH Electro Optical Systems, and as generally described in U.S. Pat. No. 7,850,885 among many that can be referenced as assigned to EOS GmbH. It will be understood that this invention is applicable to other additive manufacture systems and processes, such as those using liquid polymer photo-curable materials.

Figure 3:
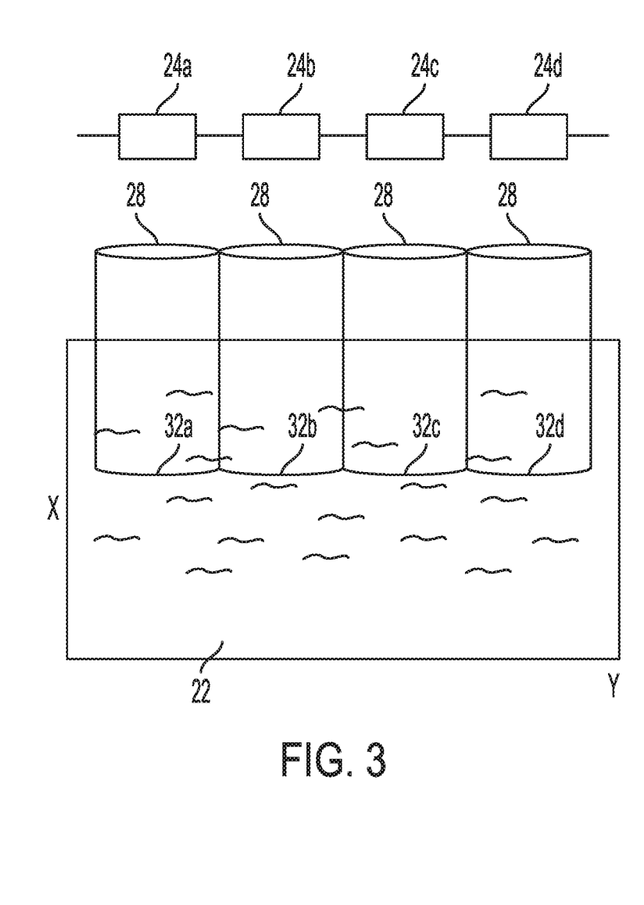
FIG. 3 is an illustration of the use of multiple GLV devices for a wider working portion of the build area.

The invention is expandable, or scalable. As shown in FIG. 3, one way to increase the portion of the build area exposed to the laser source 10 is to arrange multiple GLV devices with associated major components previously described. Thus, multiple GLV devices would be organized and coordinated using scanners 24*a* through 24*d* focusing through respective F-theta lenses 28 for an extended line of linear arrays 32*a* through 32*d*. These combined linear arrays could then be moved as a single line across the build area. Alternatively, a single but much larger GLV device could be used, and a larger F-theta lens in place of multiple such lenses.

A prototype was made and operated using a GLV made by Silicon Light Machines which was a 808 GLV type pixelated to 1088 individually controllable beams across a 2 cm width, resulting in approximately an 18 micron spot size per pixel. Such GLV devices comprise a plurality of ribbonlike microbridges or fingers individually movable on a substrate such as silicon or the like. These are arranged in parallel to thereby form reflectors by which a light or other radiation source is controlled to pass or not pass, as controlled by a voltage applied between the fingers and substrate. A pixel may be constituted by multiple fingers to thereby create a diffraction grating, for differing optical paths. In the prototype, the 808 GLV system from Silicon Light machines incorporated the necessary optics to output a planar beam. The planar beam was then passed into a beam expander from Thor Labs http://www.thorlabs.com. The expanded beam which was then projected through an F theta lens from Sill Optics with a 400 mm focal lens to produce an operational 12 cm width beam at the build area surface. The build surface area of the successfully tested prototype system was 120 mm by 120 mm. The "spot" size of a single pixel in the foregoing system set up was 110 micron. It is considered desirable to reduce the beam width, perhaps to 2 cm or less at the build area surface, to achieve higher energy density in the beam and allowing the employment of more effective scan strategies. Furthermore, reducing the beam width also decreases the single pixel spot size which enables finer resolution objects to be scanned on the build area surface.

In testing, successful build scanning of a build area of the foregoing size was achieved in approximately 12.4 seconds, which was considered an improvement of about seven times that of the system which the GLV arrangement replaced. With higher laser power input into the GLV, or a PLV, faster scanning times over a similar size build area can be achieved. For example, with a 1 kW laser input into a 1064 nanometer GLV device, scanning times could be reduced by over 10 times the current GLV example.

Control of the GLV and scanning application was accomplished using a control software provided by Silicon Lights using a National Instruments Labview application. The scanning system galvo was controlled using a scanning software produced by Integra Services International, Inc.

Multiple passes, potentially at high frequencies, may be used to yield sufficient energy for the solidification of that layer. In one example demonstration of the concept, the system described above was used to scan the same pattern on the build surface area between two and one hundred times in the same amount of time as a single pass (12.4 seconds as referenced above). The resultant objects formed were shown to have better absorption of energy and potentially higher object density. Such a system could potentially reduce the total amount of energy which must be delivered to the build surface to form objects, thus allowing the system to be operated faster for the same amount of input power.

In the standard process of laser melting or fusing, it is desirable to heat the powder material in the build area to a temperature below but near its melting point. Techniques currently employed to accomplish this typically rely upon separate heating elements, such as radiant heaters located in the build chamber, which of course then add to the cost and complexity of the system. The present invention can, however, accomplish the same general build area heating using the laser energy source.

For example, the linear array 32 can be defocused when not operated for material solidification, and scanned across the powder bed to thereby deliver a lower power beam spread which heats the powder in general, but not enough for melting/solidification. So too, the linear array being output could be of reduced power for a warming scan. The warming scans could be used in synchronization with the solidifying scans.

Since the GLV effectively produces the equivalent of pixels individually controllable in the linear array 32, this yields an ability to create better mechanical properties in the object being generated. For instance, heat control in the immediate vicinity of the object can now being controlled on a micro level, versus a macro general heating. The ability to vary the intensity of individual pixels in the linear array also allows smoother surfaces and finer detail resolution, referred to as gray scale printing. Furthermore, the temperature distribution and heat flows in the entire build surface can be more accurately managed by the point source heating capability of the GLV used in this configuration.

It is also possible to control the output of the GLV, i.e., the linear array, to something other than a static sweep of the associated scanner. The output of the GLV could thereby be oriented to effectively "jump" the output to selective portions of the build area. A second embodiment is shown in FIGS. 4 through 6, and 8. In this embodiment, a scanner operating in an x-y plane is employed. Looking at FIG. 4, with like numbers indicating like parts or elements, the energy beam from the laser 10 reflected off of a GLV 16 (of the type as previously described), thence through a series of optics 40. In this version, the optics system 40 could be comprised of two n-SF11 lenses and one n-BK7 lens, yielding five spherical surfaces and one aspherical surface. Image width at the build area surface 22 may be approximately 80 mm. Again, the optical train can vary and be adapted as readily understood by those of skill in the art.

Figure 4:
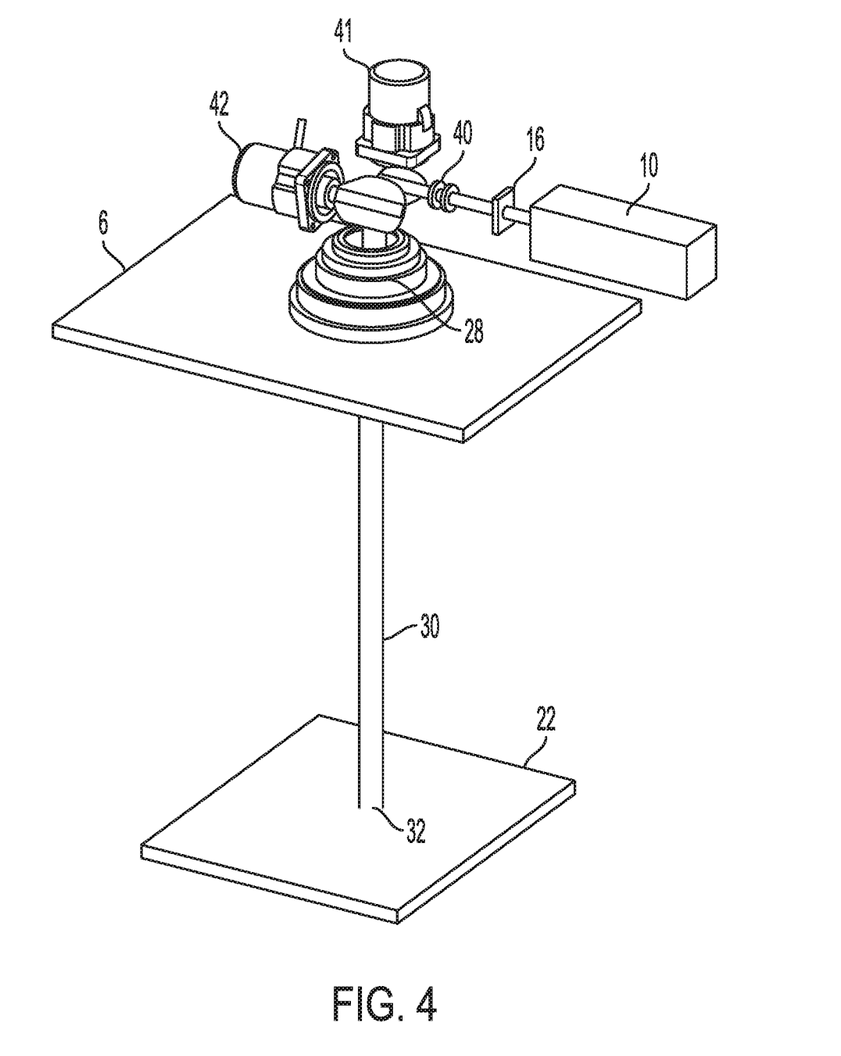
FIG. 4 is a perspective schematic view of a second embodiment, this one employing an x-y scanning galvanometer.
Figure 5:
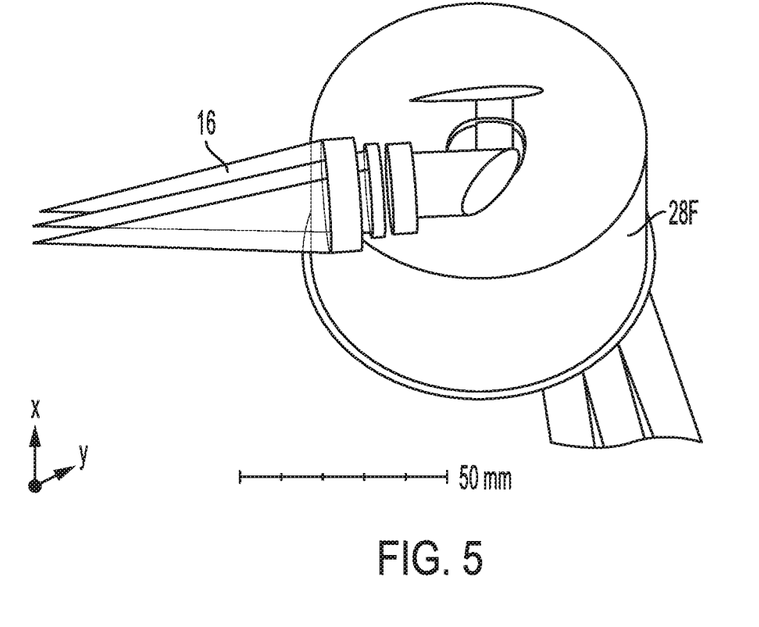
FIG. 5 is a schematic representation somewhat in perspective of the optical train of the FIG. 4 embodiment.
Figure 6:
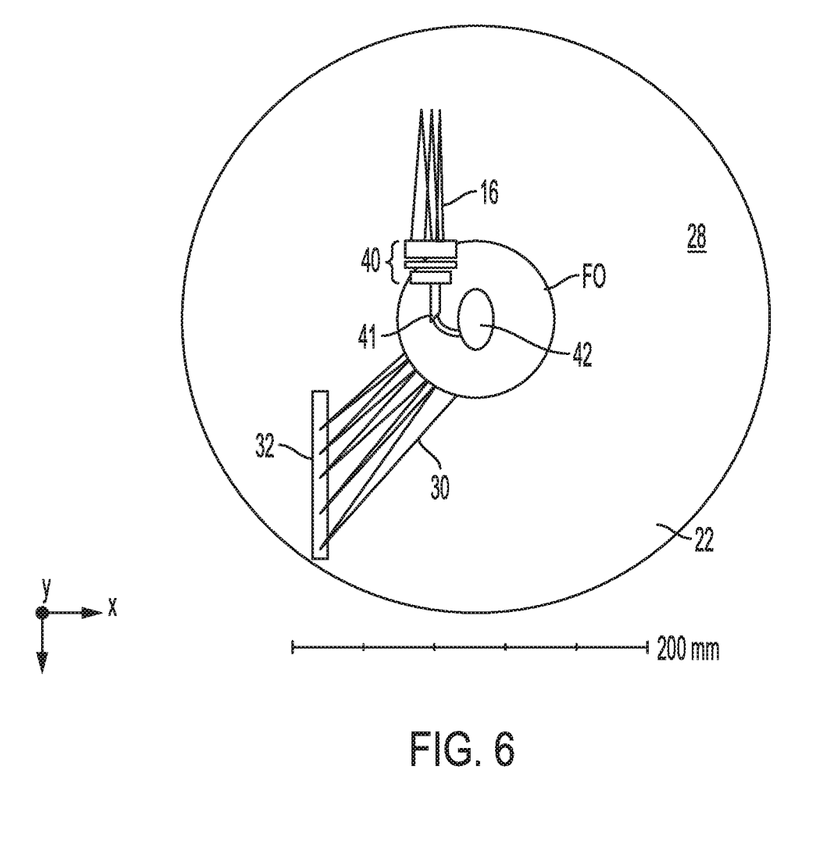
FIG. 6 is a schematic "top-down" view of the system of FIG. 5.

The scanner employed is a standard x-y scanner manufactured and sold by Cambridge Technology. It has two controllable galvos 41 and 42 for x and y light beam control and movement. Details of this type of scanner can be found at cambridgetechnology.com. The beam as directed by the scanner system is then processed through the F-theta lens 28, with a resultant beam 30 yielding a linear array 32 at the build area surface 22. Turning to FIGS. 5 and 6, the optical train is further illustrated and understood.

Figure 7:
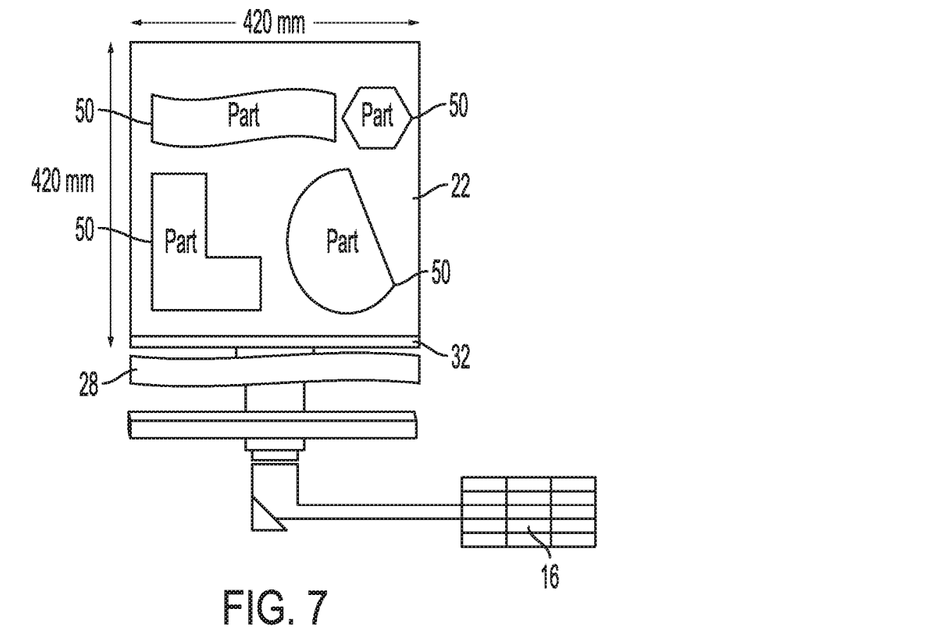
FIG. 7 is a representation of the conceptual operation of the first embodiment.
Figure 8:
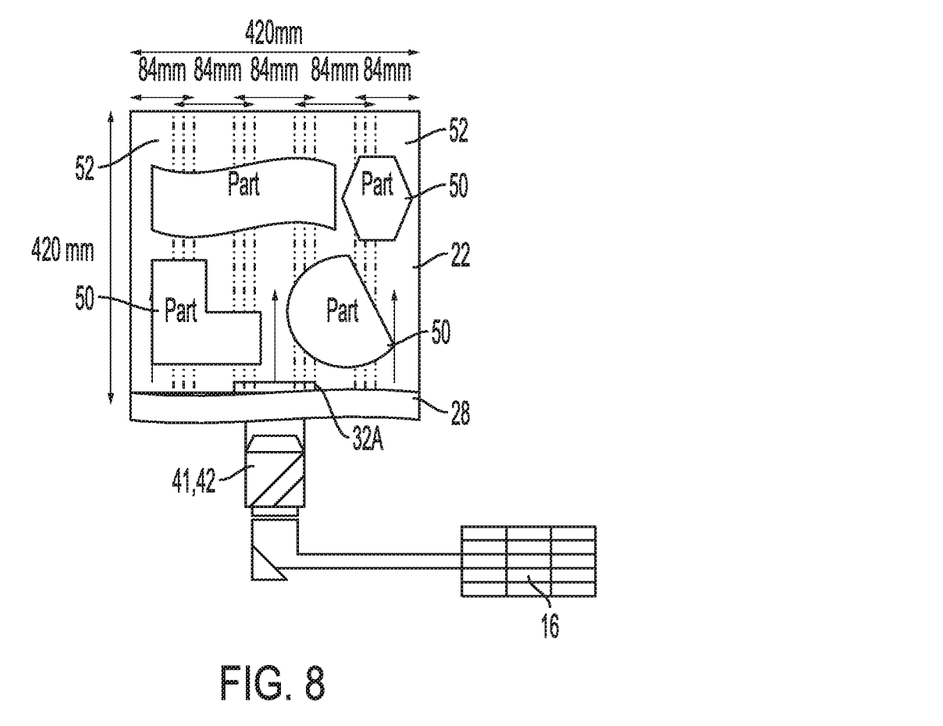
FIG. 8 is a representation of the conceptual operation of the second embodiment.

Looking at FIGS. 7 and 8, the general conceptual arrangement and operation of the two embodiments described above can be seen. In FIG. 7, the resultant linear beam is more or less spread across the build area 22. Various parts 50 may be made simultaneously, to use the build area most efficiently. The resultant beam or linear array 32 is moved back and forth across the build area, with the GLV operated to apply energy through the selected ribbons (i.e., as pixels) as targeted in the build sequence for that "slice."

In FIG. 8, we see a smaller linear array 32a as the output at the build area surface. That array, using the same laser as that of FIG. 7, now provides the energy output in a shorter line, concentrating the heating output while also achieving finer spot size on the build surface as the shorter line retains the pixel output of the GLV device (in this case 1,088). Using the x-y scanning approach, the smaller linear array 32a is swept back and forth across the build area 22 in rectangular paths 52, in a ratchet-type raster scan similar to a video mode. As shown in this rendition, the paths 52 are approximately 84 mm, overlapping slightly over a build area width of 420 mm. A single scan of the entire bedwidth can still be accomplished in the same time, however, within each stripe the line beam can be rapidly jumped to only those cross-sectional areas that need to be melted, thus affording the opportunity to greatly increase the overall speed at which a layer can be completed.

Using the system of the second embodiment (e.g., FIG. 8), it can be understood that the beam paths can be controlled so that the beam can "skip" to a desired path if no part area is to be solidified in another path. This then enables a further increase in the speed of a build, as only those areas requiring solidification need be employed.

A variant on the type of arrangement of FIG. 7 would also employ a smaller linear array 32a, but use a series of mirrors (galvos) each separately aligned with a specific beam path 52. Depending upon whether a mirror was engaged or not to intercept the working beam, a mirror would deflect the beam to a given path, or not. Similarly, such an arrangement could be accomplished by a linear translation of a single mirror along one axis and using the mirror to project the line beam onto a single galvo mirror and through an F-theta lens to sweep in the other axis along the build surface.

With this type of scanning system discussed in the above embodiment, traditional scanning techniques such as skywriting (where the beam follows a loop at the end of a line scan to start a return scan back) and EOV (end of vector) scanning controls employed in many of today's single point scanning systems can be eliminated resulting in higher productive time and throughput of the scanning system.

Thus, while the invention has been described with respect to the foregoing embodiment or embodiments, it will be apparent to those skilled in the art that various changes and modifications can be made without departing from the scope and spirit of the invention, as will be captured in the claims which follow. The foregoing descriptions are provided for illustration and teaching, and not for purposes of limiting the invention.

What is claimed is:

1. A method for making an object in additive manufacture using an energetic source of solidifying radiation working upon a material in a build area having a length and a width, comprising:
    (a) providing an optical element expanding a single laser beam source into a planar beam;
    (b) providing at least one light valve, which is a grating light valve (GLV) or planar light valve (PLV), receiving the planar beam;
    (c) providing an optical system for expanding a beam generated by the at least one light valve to thereby create an expanded beam;
    (d) providing a single galvanometer scanning device which receives the expanded beam from the optical system, and wherein the single galvanometer scanning device conveys the expanded beam toward a build area surface, the beam source, the optical element, the at least one light valve, the optical system, and the single galvanometer scanning device being associated in an optical train;
    (e) correcting the expanded beam from the single galvanometer scanning device for distortion prior to exposing the build area to create an elongated expanded work beam having an end-to-end linear beam length;
    (f) locating the beam source, the optical element, the at least one light valve, the optical system, and the single galvanometer scanning device isolated outside of a build chamber; and
    (g) operating the at least one light valve and the single galvanometer scanning device according to a predetermined exposure detail constituting individual layers or slices in a building of the object through additive manufacture, whereby the elongated expanded work beam is scanned along the length of the build area but a beam length of the elongated expanded work beam is less than the width of the build area, the elongated expanded work beam thereby being applied to the build area surface in passes along the length of the build area to fuse the material in the build area surface,
    wherein the step of operating the at least one light valve and the single galvanometer scanning device according to the predetermined exposure detail in the building of the object through additive manufacture includes a first step of heating the material in the build area surface to a temperature below that of solidification of the material using the at least one light valve and the single galvanometer scanning device, and then operating the at least one light valve and the single galvanometer scanning device in a subsequent step of fusing the material in the build area surface.

2. The method of claim 1, wherein the passes are adjacent to one another and together cover a contiguous exposure area of the build area surface in building of a layer.

3. The method of claim 1, wherein the passes can be controlled to move the elongated expanded work beam along only desired lengthwise passes and thereby covering less than an entire build area surface in a building of a layer.

4. The method of claim 1, wherein the elongated expanded work beam is operated in a raster scan mode.

5. The method of claim 1, wherein the elongated expanded work beam is operated in a TV mode.

* * * * *